United States Patent [19]

Long

[11] 4,239,063
[45] Dec. 16, 1980

[54] MANIFOLD INSULATED WITH KNITTED IMPREGNATED SLEEVE

[75] Inventor: Richard L. Long, Rowland Heights, Calif.

[73] Assignee: The United States of America as represented by the Secretary of the Army, Washington, D.C.

[21] Appl. No.: 891,255

[22] Filed: Mar. 29, 1978

[51] Int. Cl.³ .............................................. F16L 11/02
[52] U.S. Cl. .................................. 138/123; 138/149; 138/174; 138/177; 138/DIG. 2; 252/62
[58] Field of Search .............. 138/123, 124, 141, 149, 138/DIG. 2, DIG. 7, 125, 174, 177; 252/62; 139/420 C, 387 R

[56] References Cited

U.S. PATENT DOCUMENTS

| 2,468,493 | 4/1949 | Greenwald | 138/125 |
|---|---|---|---|
| 2,594,838 | 4/1952 | Alexander et al. | 138/174 |
| 3,007,497 | 11/1961 | Shobert | 138/125 |
| 3,310,412 | 3/1967 | Hofstadt et al. | 139/420 C |
| 3,399,092 | 8/1968 | Adams et al. | 138/123 X |
| 3,594,205 | 7/1971 | Gulledge et al. | 252/62 |
| 3,911,961 | 10/1975 | Peyton et al. | 138/149 |
| 3,930,627 | 1/1976 | Miller | 138/177 |
| 4,031,700 | 6/1977 | Yamazaki et al. | 138/149 |

Primary Examiner—Willis Little
Attorney, Agent, or Firm—William G. Gapcynski; Werten F. W. Bellamy; James T. Deaton

[57] ABSTRACT

A manifold with a knitted resin impregnated sleeve that is fabricated as a continuous unseamed configured sleeve and installed in the manifold to produce a seamless structure. The sleeve is knitted or woven from conventional materials and then install in the manifold to provide insulation for the manifold structure.

2 Claims, 2 Drawing Figures

MANIFOLD INSULATED WITH KNITTED IMPREGNATED SLEEVE

DEDICATORY CLAUSE

The invention described herein may be manufactured and used by or for the Government for governmental purposes without the payment of any royalty thereon.

BACKGROUND OF THE INVENTION

Flyable hot gas manifolds require an internal insulation to prevent the high temperature, pressure, and enthalpy contained fluid from burning through the necessarily lightweight manifold walls. Several thermal protection systems have been tried in an effort to protect hot gas manifold for life of the mission. These systems range from the too heavy heat sink concept to the too soft and frangible cast in place ablating elastomers. The insertion of prefabricated, premachined, rigid sleeves results in various seams between the sleeves at all joints particularly at intersections such as tees and elbows. It is at these seams where a discontinuity in the material exist and where the fluid is subject to maximum turbulence, usually caused by changing its direction of flow, that mission shortening burn-throughs occur.

Therefore, it is an object of this invention to provide a seamless liner that is continuous-fiber reinforced so that it will not spald, flake or otherwise produce downstream valve jamming debris and still survive the mission without burn-through problems.

Another object of this invention is to provide a knitted inorganic fiber resin impregnated sleeve fabricated as a continuous unseamed configured detail, installed, and then cured in place.

Still another object of this invention is to provide a knitted or woven sleeve that is lightweight, is seamless, is reinforced with continuous full depth fibers, and a sleeve which requires no pre or post installation machining or exotic installation techniques.

A still further object of this invention is to provide an insulating device that can be used to insulate both cold to cryogenic fluid systems as well as hot gases.

Still another object of this invention is to provide a knitted sleeve which allows configuring the sleeve economically to any shape desired.

Yet another object of this invention is to provide a sleeve that has a biaxial stretch that permits it to intimately contact all surfaces without distortion when it is installed in slightly mismatching channels.

Other objects and advantages of this invention will be obvious to those skilled in this art.

SUMMARY OF THE INVENTION

In accordance with this invention an insulated manifold is provided in which the manifold has a knitted or woven sleeve configured to fit the inside diameter of the manifold and in which the sleeve is secured to the manifold structure by a resin or other adhesive that secures the sleeve to the manifold. The resin or adhesive is cured in a conventional manner by curing the sleeve in position using a solid mandrel or bleeder isolated pneumatic bladders or equivalent devices to hold the sleeve in position. The system or device is independent of the choice of resin, yarn, the choice of stitch or weave and the cure procedure.

DESCRIPTION OF THE PREFERRED EMBODIMENT

Figure 1:
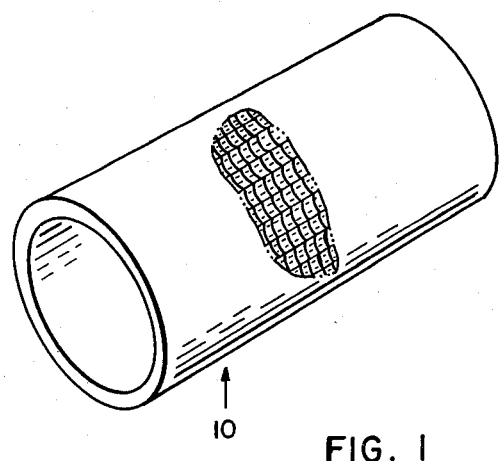
FIG. 1 is a schematic view illustrating a knitted sleeve in accordance with this invention.

Referring now the drawing, FIG. 1 shows a sleeve 10 in accordance with this invention that is made of knitted inorganic fiber that are later resin impregnated before being installed and cured in place. Knitted or woven sleeve 10 is lightweight, seamless, reinforced with continuous full depth fibers, and has the added features of not requiring pre or post installation machining or exotic installation techniques.

Figure 2:
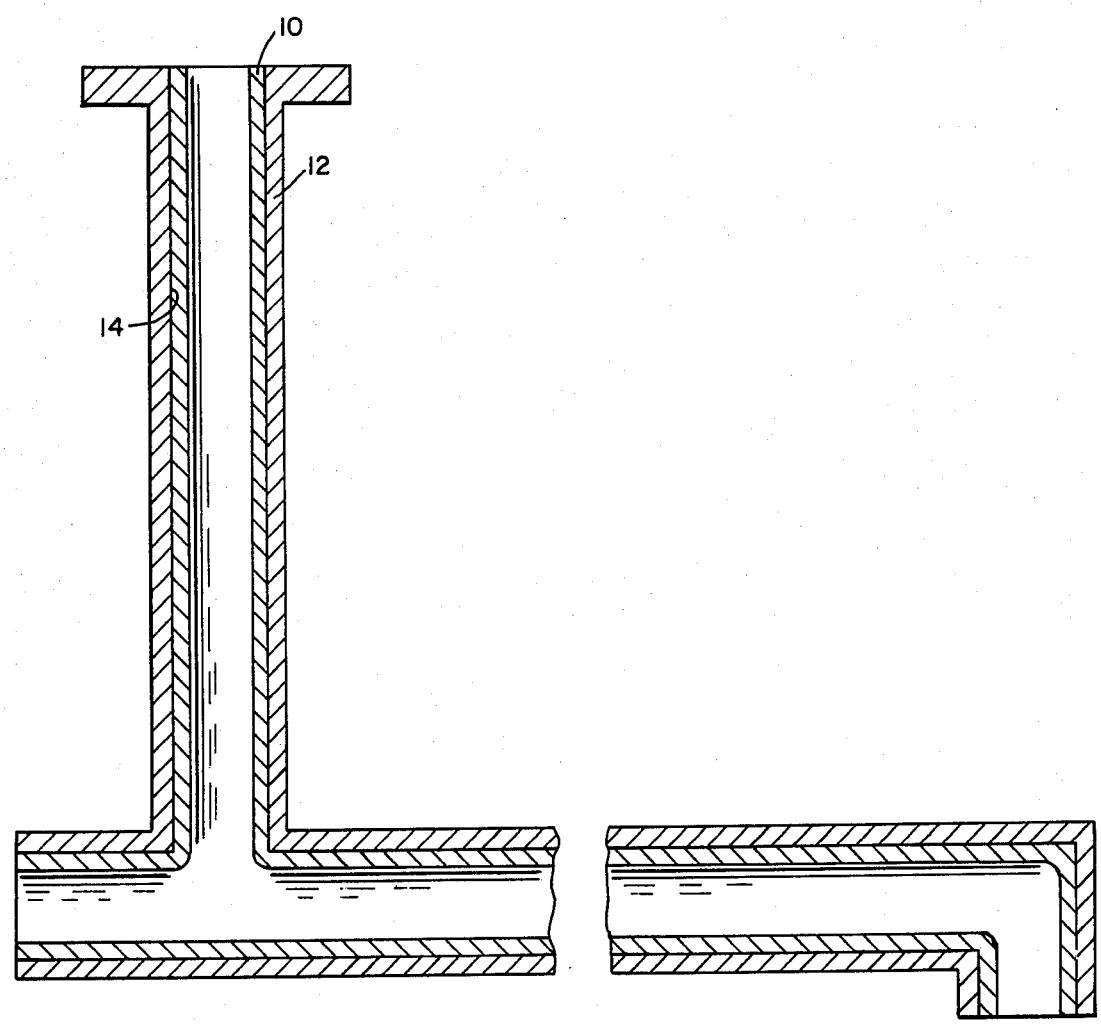
FIG. 2 is a sectional view illustrating the sleeve in a manifold structure.

The sleeve in a thermal protection system consists of knitted or woven sleeve 10 configured to fit the inside diameter of hot gas manifold section 12 (see FIG. 2) that is to be lined. The configured shapes of the manifold can range from simple straight cylinders to double intersecting tees. That is, the sleeve can be knitted or woven in these shapes before being inserted and bonded to the inner surface of the manifold. The thickness of sleeve 10 can be varied by the tightness of knit and the size of the yarn as it goes through a configured shape. Sleeve 10 is impregnated with an uncured resin such as any of the conventional phenolic resins is then inserted in the mandrel shape that is to be lined. The sleeve is then cured in position using solid mandrels or bleeder isolated pneumatic bladders or equivalent devices to hold sleeve 10 in position. Insulating sleeve 10 of this invention is independent of the choice of resin, yarn, the choice of stitch or weave and the cure procedure. These parameters will be selected in accordance with the particular application of sleeve 10. The smoothness of the interior of mandrel 12 can be controlled to a large extent by the resin content of sleeve 10, the tooling, and the diameterof the yarn and tightness of knit.

A preferred embodiment of this invention uses a sleeve that is made of quartz fibers that are woven to the desired configuration, impregnated with a phenolic resin, and then placed in manifold 12 and cured in position. In some applications, it is desirable to coat the quartz fabric with zirconia or titanium and in other systems, an inorganic binder may be desirable for bonding the sleeve to the mandrel to be protected. The sleeve is installed with the wet resin or binder and then cured in position to produce a seamless liner that is in intimate contact with the inner channel surface 14 of the mandrel. By inserting the sleeve and curing it in place, the pores of the sleeve are not sealed with cured resin or other binder and any gases present or generated under the sleeve during cure can escape through the sleeve. This allows the creation of a more void free bond line of sleeve 10 to channel wall 14. It is also pointed out that sleeve 10 in the knitted form has a biaxial stretch that allows it to intimately contact all surfaces without distortion when it is installed in slightly mismatching channels. It is also pointed out, that sleeve 10 can be used to insulate cold to cryogenic fluid systems as well as hot gas manifolds.

In operation, as can be seen sleeve 10 protects mandrel 12 and prevents if from being eroded away by the gases or fluid flowing therethrough.

I claim:

1. A thermal protection system comprising a manifold section, a knitted one piece, continuous, unseamed, configured sleeve of one thickness that is configured to fit an inside diameter surface of said manifold section to be lined, said sleeve being made of quartz fabric, said sleeve being impregnated with an uncured phenolic resin bonding agent, and said sleeve with said uncured bonding agent being cured and bonded to the inside diameter surface of said manifold section to insulate the manifold section.

2. A thermal protection system as set forth in claim 1, wherein said quartz fabric is coated with a material selected from the group consisting of zirconium, titanium and a combination thereof, and wherein said fabric is coated before being bonded to said inside diameter.

* * * * *